// United States

Pommer et al.

[11] 3,903,288
[45] Sept. 2, 1975

[54] PESTICIDE FOR THE PROTECTION OF WOOD COMPRISING A MIXTURE OF METHYL 2-BENZIMIDAZOLE-CARBONATE OR A SALT THEREOF AND THE ALUMINUM SALT OF N-NITROSO-N-CYCLOHEXYLHYDROX-YLAMINE

[75] Inventors: Ernst-Heinrich Pommer, Limburgerhof; Wolfgang Reuther, Heidelberg, both of Germany

[73] Assignee: BASF Aktiengesellschaft, Ludwigshafen (Rhine), Germany

[22] Filed: Oct. 12, 1973

[21] Appl. No.: 405,807

[52] U.S. Cl. .................. 424/273; 117/147; 260/22; 424/325
[51] Int. Cl. ........................... A01n 9/20; A01n 9/22
[58] Field of Search ............................. 424/273, 325

[56] References Cited
UNITED STATES PATENTS
3,639,630  2/1972  Sander et al. ..................... 424/325

FOREIGN PATENTS OR APPLICATIONS
1,195,180  6/1970  United Kingdom
815,538    6/1959  United Kingdom

*Primary Examiner*—Jerome D. Goldberg
*Assistant Examiner*—Allen J. Robinson
*Attorney, Agent, or Firm*—Johnston, Keil, Thompson & Shurtleff

[57] ABSTRACT

New and valuable pesticides containing a mixture of active ingredients and a method of combatting pests with the said mixture.

3 Claims, No Drawings

PESTICIDE FOR THE PROTECTION OF WOOD COMPRISING A MIXTURE OF METHYL 2-BENZIMIDAZOLE-CARBONATE OR A SALT THEREOF AND THE ALUMINUM SALT OF N-NITROSO-N-CYCLOHEXYLHYDROXYLAMINE

The present invention relates to a new and valuable pesticide containing a mixture of active ingredients and a method of combatting pests with the said mixture.

It is known that salts of N-nitroso-N-cyclohexylhydroxylamine (NCH) may be used for the protection of wood against attack by fungi such as *Coniophorn cerebella, Merulius lacrimans, Lentinus lepidus,* etc. Of the salts of NCH which are practically insoluble in water the aluminum salt has proved to be suitable; it is a disadvantage however that fairly high concentrations have to be used to protect the wood. It is also disadvantageous that this compound is not effective (when used in concentrations adequate for combatting ligniperdous fungi) against wood-discoloring fungi such as *Pullularia pullulans* and *Sclerophoma pityophila.*

It is also known that methyl 2-benzimidazolecarbamate (BCM) can be used for combatting a multitude of fungi which belong mainly to the Ascomycetes and Fungi imperfecti classes; employed in the usual concentrations this compound is ineffective against ligniperdous fungi of the Basidiomycetes class.

We have now found that a mixture of BCM, or an alkali metal salt thereof, and the aluminum salt of NCH is suitable as a pesticide.

Examples of suitable alkali metal salts are the sodium and potassium salt. The sodium salt is preferred.

The pests concerned are fungi and insects in general and particularly those fungi and insects which damage wood, wood coatings or paints.

Pesticides according to the invention advantageously contain as solvent a glycol ether derivative because the active ingredients and particularly the sodium salt of BCM have good solubility therein. Examples of glycol ether derivatives are methyl glycol, n-butyl glycol, methyl diglycol, ethyl diglycol, dipropylene glycol, butyldiglycol, and polyhydric alcohols such as monoethylene glycol, diethylene glycol, triethylene glycol and propylene glycol. Dipropylene glycol is preferred.

Pesticides according to the invention have a fungicidal effectiveness which is more than the sum of the effectiveness of the individual active ingredients, i.e., synergism is evident. The ratio in which the active ingredients are mixed may be varied within a wide range. For example an outstanding action on pests is achieved at a weight ratio of aluminum salt of NCH to BCM or an alkali metal salt of BCM of from 1:1 to 10:1, preferably 2:1 to 4:1.

A liquid oily wood preservative which is applied at the rate of from 100 to 200 ccm/m$^2$ of wood surface may contain up to 4% (by weight) of aluminum salt of NCH and up to 1% of the sodium salt of BCM; an optimum mixture contains 2% of the aluminum salt of NCH and 0.5% of the sodium salt of BCM, based on the total weight of the preservative.

A preserving agent for disperse dyes may contain up to 4% of the aluminum salt of NCH and up to 1% of BCM; an optimum mixture contains 2% of aluminum salt of NCH and 0.5% of BCM, based on the total weight of the disperse dye. This mixture is outstandingly suitable as an additive to disperse dyes for coatings in damp rooms to prevent fungal growth.

In addition to their fungicidal effect, the pesticides according to the invention have an excellent insecticidal action on ligniperdous insects such as Hylotrupes bajulus, Anobium punctatum and Lyctus brunneus. The following ligniperdous and wood-discoloring fungi as well as soft-rot and mold fungi may be controlled by the pesticides according to the invention: *Merulius lacrimans, Coniophora cerebella, Lentinus lepideus, Poria Vaporaria, Lenzites trabea, Paxillus panuoides; Pullularia pullulans, Aspergillus niger, Bispora effusa, Stachybotrys atra, Trichoderma viride, Paecilomyces variotii, Cladosporium herbarum, Sclerophoma pityophila, Chaetomium globosum, Hormiscium spec., Stemphylium spec., Alternaria spec.,* and *Phoma violacea.*

The pesticides according to the invention may not only be used as fungicidal and insecticidal constituents of oily wood perservatives; they are also suitable for the preservation of industrial products such as distempers, disperse dyes, leather, adhesives and paper, and also for the production of mold-resistant paints and oleoresin, alkyd resin and synthetic resin surface coatings.

The pesticides according to the invention may be used by treating, for example impregnating or brushing, wood therewith, or by mixing them with liquids to be protected against pest attack, or by mixing with liquids which are to provide pesticidal properties.

The production of concentrates of active substances and further processing into oily wood preservatives are described in the following examples.

EXAMPLE 1

A 50% (by weight) active ingredient concentrate having a ratio of aluminum salt of NCH to sodium salt of BCM of 2:1 is prepared as follows: 146.5 parts (by weight) of dipropylene glycol is heated at 80° to 100°C; while stirring, a mixture of 103.5 parts of the aluminum salt of NCH (96.7% purity) and 50 parts of the sodium salt of BCM is added in portions. After all the solid active ingredients have dissolved the solution is allowed to cool; a viscous paste is obtained.

To prepared an oil wood preservative containing 1.5% of the mixture (ratio 2:1) of the active ingredients, 30 parts of the above concentrate is heated at 100°C with 286 parts of an alkyd resin having a medium oil content (20% solid resin) until a homogeneous solution has formed. It is allowed to cool; at 80°C there is added 484 parts of a naphtha fraction containing aromatics, the whole is filtered if necessary to remove impurities and then at ambient temperature 200 parts of a naphtha fraction containing aliphatics is added.

EXAMPLE 2

A 25% active ingredient concentrate having a ratio of aluminum salt of NCH to sodium salt of BCM of 4:1 may be prepared as follows: 75 parts of dipropylene glycol is heated at 140° to 160°C and 7.5 parts of the sodium salt of BCM is slowly introduced. The whole is allowed to cool and 100 parts of an aromatics-containing naphtha fraction which also contains 30% of the aluminum salt of NCH in dissolved form is added to the solution.

To prepare an oily wood preservative containg 2.5% of active ingredient mixture (ratio 4:1) 122 parts of the above concentrate has 14.3 parts of an alkyd resin of medium oil content added to it while heating, and the mixture is stirred until a homogeneous solution has been formed. 48.5 parts of a naphtha fraction containing aromatics is then added followed after cooling by 25 parts of naphtha fraction containing aliphatics.

To prepare water-repellent impregnation paints water repellents may be added to the oily wood preservative mixtures. Examples of suitable substances are zinc stearate, aluminum stearate and waxes. Inorganic or organic pigments may also be incorporated into the mixtures to achieve color effects.

To protect wood against fungal attack an amount of from 50 to 200 ml of the oily wood preservative described in Examples 1 and 2 is usually applied per m² of wood surface by brushing, spraying or dipping. The amount applied is dependent for example on whether planed or rough wood is to be protected and what protective effect is to be achieved. The amount of active ingredient mixture necessary to protect the wood is from 1 to 10 and preferably from 2 to 5 grams per m² of wood surface; preferred amounts are 2.5 g (mixture ratio 4:1) and 3 g (mixture ratio 2:1), calculated as a mixture of the solid active ingredients without having regard to the amount of solvent, pigment and surface coating material.

The very good fungicidal and insecticidal effectiveness of the agents according to this invention will be seen from the following Examples.

EXAMPLE 3

In accordance with Butin's method ("Verschaerfte Muendener Streifenmethode; Verfahren zur Bewertung der blaeuehemmenden Eigenschaften oeliger Grundiermittel," described in the periodical Farbe und Lack, 71, No. 5, 1965, pages 373 to 374) the effectiveness of the active ingredient mixtures described in Example 1 and 2 are tested on the sap-staining fungi *Sclerophoma pityophila* and *Pullularia pullulans*. As comparative agents, mixtures are used which contain either 1% of the aluminum salt of NCH or 0.5% of the sodium salt of BCM. These mixtures are composed as follows:

a. 1% (by weight) of the aluminum salt of NCH, 10% of an oil-modified alkyd resin, 30% of a naphtha fraction containing aliphatics and 59% of a naphtha fraction containing aromatics;

b. 0.5% of the sodium salt of BCM, 3% of dipropylene glycol, 14.5% of an oil-modified alkyd resin, 42% of a naphtha fraction containing aliphatics and 40% of a naphtha fraction containing aromatics. The control surfaces (without active ingredient) are painted with linseed oil varnish.

To carry out the tests, pine sapwood boards are treated on one half once with 50 or 100g or in two operations with 2 × 100 g of the wood preservative mixture. The control surfaces are coated with the same amount of linseed oil varnish. After a colorless alkyd resin coating material has been applied the boards are weathered for six months and then placed in Kolle culture flasks for fungus testing. After the test is over the control surfaces of the test boards have been discolored to an average extent of 90% by the growth of Sclerophoma pityophila and Pullularia pullulans. The results of the tests are given in the following Table. The efficiency of the mixtures of active ingredients and of the individual active ingredients is calculated by Abbot's formula:

$$\text{efficiency } \% = \frac{\text{attack in control} - \text{attack in test}}{\text{attack in control}} \times 100.$$

In the Table the following mixtures or substances are used:

A = according to Example 1
B = according to Example 2
C = aluminum salt of NCH
D = sodium salt of BCM
E = linseed oil varnish without active ingredient The columns in the Table are as follows:

1 = amount in g/m² applied to pinewood surface
2 = amount in g/m² of NCH and BCM applied to pinewood surface
3 = percentage of wood surface discolored
4 = efficiency in % of active ingredient mixture
5 = efficiency in % of individual active ingredients
6 = sum in % of the actions of the individual active ingredients

TABLE 1

|   | 1 | 2 NCH | BCM | 3 | 4 | 5 | 6 |
|---|---|---|---|---|---|---|---|
| A | 50 | 0.5 | 0.25 | 50 | 44 |   | 22 |
| A | 100 | 1 | 0.5 | 20 | 78 |   | 68 |
| A | 200 | 2 | 1 | 0 | 100 |   | 89 |
| B | 50 | 1 | 0.25 | 25 | 72 |   | 34 |
| B | 100 | 2 | 0.5 | 0 | 100 |   | 73 |
| C | 50 | 0.5 |   | 90 |   | 0 |   |
| C | 100 | 1 |   | 80 |   | 12 |   |
| C | 200 | 2 |   | 75 |   | 17 |   |
| D | 50 |   | 0.25 | 70 |   | 22 |   |
| D | 100 |   | 0.5 | 40 |   | 56 |   |
| D | 200 |   | 1 | 25 |   | 72 |   |
| E | 100 |   |   | 90 | 0 |   |   |

EXAMPLE 4

Pine sapwood blocks having the dimensions 50 mm × 25 mm × 15 mm are each coated with the wood preservative mixtures described in Examples 1 and 2 at the rate of 100 and 200 g/m² of wood surface to determine their effectiveness against wood-destroying fungi in accordance with German Standard Specification DIN 52,176, page 1: "Pruefung von Holzschutzmitteln, Mykologische Kurzpruefung (Kloetzchen-Verfahren)." After storage for 4 weeks the treated blocks and untreated blocks are placed in culture flasks which contain as test fungi *Coniophora cerebella* and *Merulius lacrimans*. The flasks are then incubated in an air-conditioned room at a temperature of 22°C and a relative humidity of 70%.

After four months the blocks are taken out, freed from adhering fungus mycelium and dried. The extent of wood destruction is then determined by ascertaining the weight loss and by employing the DIN evaluation scheme. The results are shown in the following Table in which the abbreviations have the following meanings:

A = mixture according to Example 1
B = mixture according to Example 2
F = untreated control
(a) = amount of mixture applied in g/m² of pinewood surface
(b) = percentage loss in weight using *Coniophora cerebella* as test fungus
(c) = degree of destruction caused by *Coniophora cerebella*

(d) = percentage loss in weight using *Merulius lacrimans* as test fungus (e) = degree of destruction caused by *Merulius lacrimans*.

Evaluation scheme:
2a—parts of block under slight attack
2b—all of block under slight attack
3a—parts of block under heavy attack
3b—all of block under heavy attack
4a—parts of block completely destroyed
4b—all of block completely destroyed

|   | (a) | (b) | (c) | (d) | (e) |
|---|-----|-----|-----|-----|-----|
| A | 100 | 0   | 1   | 0   | 1   |
|   | 200 | 0   | 1   | 0   | 1   |
| B | 100 | 0   | 1   | 0   | 1   |
| F | —   | 25  | 3b/4a | 21 | 3b |

EXAMPLE 5

The prophylactic effectiveness of wood preservative mixtures against wood-destroying insects is tested in accordance with the German Standard Specification DIN 52,163 using the larvae of house longhorn beetles (*Hylotrupes bajulus*). Pine sapwood blocks having the dimensions 50 mm × 25 mm × 15 mm are used. The rate of application is 50 and 100 g/m² of wood surface. After the larvae have been placed on the small test blocks the latter are exposed at 20°C and a relative humidity of 65% over a period of 4 weeks to the attack of the larvae. The test results are given in the following Table:

| Wood preservative from Example 2: application rate in g/m² of pinewood surface | Condition of the larvae after four weeks: percentage | |
|---|---|---|
|  | living | dead |
| 50 | 10 | 90 |
| 100 | 0 | 100 |
| control (untreated) | 90 | 10 |

EXAMPLE 6

Active ingredient mixtures of the aluminum salt of NCH and BCM and the sodium salt of BCM in the ratios 2:1, 3:1 and 4:1 (based on the weight of active ingredient) are carefully incorporated in finely ground form into a plastics emulsion paint containing an acrylic ester copolymer as binder for the production of coating films resistant to attack by mold fungus. The amount of preservative added to the emulsion paint is from 1.5 to 4%. For comparison the individual active ingredients are added to the emulsion paint in the same way in amounts of from 0.5 to 3%. Pinewood boards (veneers) having dimensions of 50 mm × 50 mm × 1 mm are uniformly coated with the emulsion paint to determine the fungicidal resistance of the paint. After the coat has dried the boards are placed on a malt nutrient agar in Petri dishes and sprayed with a fungus spore suspension.

Fungi which appear on painted surfaces are used, viz. *Pullularia pullulans*, *Sclerophoma pityophila*, *Trichoderma viride*, *Penicillium funicolosum*, *Alternaria tenus*, *Stemphylium spec.*, and *Cladosporium herbarum*. The Petri dishes are kept at ambient temperature and the fungus spread is evaluated after 2, 4 and 6 weeks. The test results given in the following Table show the superior fungicidal effectiveness of the active ingredient mixtures over that of their individual components.

| Percentage of active ingredient added to the emulsion paint: | | Fungus spread on the paint surface after: | | |
|---|---|---|---|---|
| Al salt of NCH | Na salt of BCM | 2 weeks | 4 weeks | 6 weeks |
| 1 | 0.5 | 0 | 0 | 1 |
| 1.5 | 0.5 | 0 | 0 | 1 |
| 2 | 1 | 0 | 0 | 0 |
| 3 | 1 | 0 | 0 | 0 |
| 1 |  | 0 | 1 | 3 |
| 1.5 |  | 0 |   | 3 |
| 2 |  | 0 | 1 | 2 |
| 3 |  | 0 | 0 | 1 |
|  | 0.5 | 1 | 3 | 3* |
|  | 1 | 1 | 2 | 3* |
| Al salt of NCH | BCM | | | |
| 1 | 0.5 | 0 | 1 | 1 |
| 1.5 | 0.5 | 0 | 0 | 1 |
| 2 | 1 | 0 | 0 | 0 |
| 3 | 2 | 0 | 0 | 0 |
| 1 |  | 0 | 1 | 3 |
| 1.5 |  | 0 | 1 | 3 |
| 2 |  | 0 | 1 | 2 |
| 3 |  | 0 | 0 | 1 |
|  | 0.5 | 1 | 2 | 3* |
|  | 1 | 0 | 2 | 3* |
| control (untreated) |  | 2 | 4 | 5 |

* = mainly Alternaria and Trichoderma
0 = surface free from fungal growth graduated down to
5 = surface entirely covered by fungus.

We claim:

1. A pesticide for the protection of wood comprising a mixture of (a) methyl 2-benzimidazolecarbamate or the sodium salt thereof and (b) the aluminum salt of N-nitroso-N-cyclohexylhydroxylamine, said mixture having a weight ratio of (b):(a) of from 2:1 to 4:1.

2. The pesticide of claim 1 which contains as solvent a compound selected from the group consisting of methyl glycol, n-butyl glycol, methyl diglycol, ethyl diglycol, dipropylene glycol, butyl diglycol, monoethylene glycol, diethylene glycol, triethylene glycol and propylene glycol.

3. The pesticide of claim 1 which contains dipropylene glycol as a solvent.

* * * * *

UNITED STATES PATENT AND TRADEMARK OFFICE
CERTIFICATE OF CORRECTION

PATENT NO. : 3,903,288
DATED : September 2, 1975
INVENTOR(S) : POMMER et al

It is certified that error appears in the above–identified patent and that said Letters Patent are hereby corrected as shown below:

In the Heading, insert -- [30] Foreign Application Priority Data    October 13, 1972   Germany   P 22 50 281.4 and August 18, 1973   Germany   P 23 41 882.8 --

In Column 6, Lines 42 through 45, delete the second occurence of footnotes.

Signed and Sealed this

Fourteenth Day of September 1976

[SEAL]

Attest:

RUTH C. MASON
*Attesting Officer*

C. MARSHALL DANN
*Commissioner of Patents and Trademarks*